| United States Patent [19] | [11] | 4,071,470 |
|---|---|---|
| Davidson et al. | [45] | Jan. 31, 1978 |

[54] METHOD AND COMPOSITION FOR INHIBITING THE CORROSION OF METALS

[75] Inventors: Jerry R. Davidson, Clute; Hans R. Friedli, Lake Jackson, both of Tex.

[73] Assignee: The Dow Chemical Company, Midland, Mich.

[21] Appl. No.: 705,738

[22] Filed: July 15, 1976

[51] Int. Cl.$^2$ .................................................. C09K 3/00
[52] U.S. Cl. ........................... 252/389 R; 21/2.5 R; 21/2.7 R; 423/228; 423/229
[58] Field of Search ............................. 252/389 R, 392; 21/2.7 R, 2.5 R; 423/228, 229

[56] References Cited

U.S. PATENT DOCUMENTS

| 2,559,580 | 7/1951 | Alexandria | 423/228 |
|---|---|---|---|
| 3,349,544 | 10/1967 | Arnold et al. | 55/32 |
| 3,951,844 | 4/1976 | Mago | 252/389 R |
| 3,959,170 | 5/1976 | Mago et al. | 252/389 R |

*Primary Examiner*—Benjamin R. Padgett
*Assistant Examiner*—Josephine Lloyd
*Attorney, Agent, or Firm*—Glwynn R. Baker

[57] ABSTRACT

A method and composition for inhibiting the corrosion of metals in contact with an acid-gas absorbing medium comprising adding a product of the reaction of (1) copper or a copper salt, a copper oxide or a copper sulfide and (2) sulfur or a sulfide and an oxidizing agent and (3) a monoalkanolamine (monoethanolamine). The reaction is carried out at from 21° to about 100° C for a period of time to produce a stable non-precipitating product, i.e., reacted for from 0.1 to about 20 hours. The product is added to a gas treating plant absorbent in an amount of at least 0.00002 pounds of copper and 0.0002 pounds of sulfur per pound of medium per day.

5 Claims, No Drawings

METHOD AND COMPOSITION FOR INHIBITING THE CORROSION OF METALS

BACKGROUND OF THE INVENTION

In recent years the necessity for increased productivity of natural and synthetic gases for fuel and raw material for chemicals production has placed a strain on the existing acid-gas treating plants throughout the world. The need for greater capacity, increased sulfur removal and the processing of streams containing higher concentrations of acid gases has caused the industry to recognize the need for the ability to increase the concentration of the absorbent, i.e., alkanolamine. One consequence of operating acid-gas stripping plants under these conditions is that increased corrosion of the metal of construction of the plant occurs, particularly in the reboiler and associated piping of the regeneration portion of the plant. Therefore, a search for ways to reduce corrosion has been underway by both the absorbent media suppliers and the engineering firms who service this industry. A recent development in our laboratories has resulted in the discovery that the corrosion of acid-gas stripping plants can be inhibited by maintaining a concentration of copper and sulfur in the absorbent medium circulating through the plant. Laboratory work has correlated well with field experience relative to the inhibitory effect; but, experience has shown that much less inhibitor need be present than laboratory tests appeared to indicate. In fact it was discovered that laboratory experiments were indicative of ability of the inhibitors to passsivate new or severely corroded metals and that once passivation was achieved, much less inhibitor was necessary to maintain the passivation. In addition, pilot plant and field testing illustrated that techniques for on-line measuring of the corrosion were needed which would indicate corrosion condition onset prior to actual corrosion of the plant metals. Such an on line system would thus signal the need for greater concentration of inhibitors.

It is therefore the object of the present invention to provide (1) a commercial inhibitor composition capable of use at start-up and for maintenance of passivity during normal operation and (2) a method for determining the appropriate times to add inhibitor.

These and other objects and advantages of the present invention will become apparent to those skilled in the art from the following description and claims.

BRIEF DESCRIPTION OF THE INVENTION

A composition, suitable for inhibiting the corrosion of metals in contact with an acid-gas absorbing media containing acid-gases, such as hydrogen sulfide and carbon dioxide, consisting of the reaction product of copper metal or a copper ion yielding compound (i.e. copper salts, copper oxides or copper sulfides) and a sulfur yielding compound (i.e. sulfur or a sulfide plus an oxidizing agent) with alkanolamines, (e.g. monoalkanolamine) under anhydrous conditions is described. The reaction to prepare the composition is conveniently and preferably carried out in an alkanolamine, e.g., monoethanolamine, although it can be carried out in other of the amine solvents employed in the gas treating industry, i.e. diethanolamine, at from ambient temperature to about 100° C for a period of time sufficient to produce a stable non-precipitating composition. Conveniently, periods of from 0.1 to 20 hours are employed. The product so produced is capable of being added to an absorbent stream of a gas treating plant, as for example an aqueous alkanolamine employed as described in U.S. Pat. No. 3,349,544, in a continuous or batchwise manner in quantities so as to provide sufficient inhibitor in order to maintain the circulating absorbent medium substantially non-corrosive to the metal of construction of the plant. In particular, the product is added to provide corrosion protection to the portion of the plant which is operated at elevated temperatures, i.e., 200° F and above, namely the regenerator, wherein the acid-gases are released. The inhibitor's viscosity may be adjusted by addition of small quantities of water to facilitate handling and additions.

The amount of inhibitor composition employed may vary considerably from 0.00002 pounds per pound of absorbent (20 parts per million) of copper equivalent per day to 0.02 pounds per pound of absorbent (20000 ppm) copper equivalent per day, and 0.0001 pounds per pound of absorbent (100 parts per million) of sulfur equivalent per day to 0.2 pounds per pound of absorbent (200,000 ppm) sulfur equivalent per day. The lower concentrations ranging from about 20-100 ppm copper equivalents per day and about 100 to about 1000 ppm sulfur equivalents per day are useful in a commercial operation at a plant which has been on stream with the inhibitor for several weeks. The higher concentrations ranging from about 500 to about 2000 ppm copper equivalents per day and about 5000 to about 20000 ppm sulfur equivalents per day are the amount which may be necessary to maintain a non-corrosive condition as per a metal resistence corrosion probe in a plant just put on the system or after an upset of a plant which has been on the inhibitor for some time.

The advantage of the present inhibitor's composition is the ability to add inhibitor to a plant quickly and in measured amounts, thus, enabling an operator to follow the effect of the addition and bring a plant to a substantially less corrosive condition quickly without overshooting the required quantity of the inhibitor, needed to reestablish passivation, thus wasting it.

EXAMPLE 1

Preparation of the Inhibitor

To a stirred and heated kettle containing sixty-seven and one half pounds (67.5 lbs.) of monoethanolamine was added 31½ pounds of sulfur. The mixture was heated for 1 hour at 90° to 100° C with stirring. Copper metal, three pounds (3 lbs.) in the form of chopped copper wire was added with stirring, followed by heating at 90° to 100° C with stirring for another hour. The solution resulting from this procedure was filtered and allowed to cool to room temperature without stirring. It remained free of precipitate or solids. The mixture was stable to repeated heating and freezing cycles between 100° and −50° C. Addition of 15% water did not precipitate free sulfur, nor was sulfur extractable with carbon disulfide.

The inhibitor was introduced into the rich monoethanolamine stream of a sour gas conditioning pilot plant which processes sour gas ($CO_2$ and $H_2S$ containing natural gas). The operating conditions for the plant, inhibitor introduction rate and corrosion rates are set forth below:

| Operating Conditions | |
|---|---|
| $H_2S/CO_2$ (ratio) | 9:1 |
| Loading | .6–.8 moles acid gas/mole |

-continued

| Operating Conditions | |
|---|---|
| | MEA[1] |
| MEA[1] concentration | 30% wt. in H$_2$O |
| Flow rate | 0.25–0.3 gal/min |
| MEA inventory | 10 gal |
| Absorber | 80–150° F (gradient) |
| Stripper reboiler | 232–240° F |
| Inhibitor injection | Continuous |

[1]MEA - monoethanolamine

Over a period of 168.5 hours the corrosion rate was maintained at about zero mils penetration per year (MPY) as determined by a corrosometer with the amounts of inhibitor solution indicated in Table I.

TABLE I

| Time Period (hours) | Amount of Liquid Formulation Injected (mls) | Equivalent (mls/day) | Corrosion Rate (MPY)[1] |
|---|---|---|---|
| 27 | 143 | 127 | 0.0 |
| 24 | 88 | 88 | 0.0 |
| 23 | 184 | 192 | 0.0 |
| 25 | 155 | 148 | 0.0 |
| 21.5 | 48 | 53 | 0.0 |
| 24 | 43 | 43 | 0.0 |
| 24 | 216 | 216 | 0.0 |

[1]mils penetration per year as measured by Magna Corrosometer (an electrical resistance probe manufactured by Magna Corporation)

In a similar manner as above set forth CuS, 4.5 lbs., was substituted for Cu metal. Results were similar to those above set forth.

EXAMPLE 2

In the following test, the same pilot plant was operated under lower daily inhibitor injection rates to determine if corrosion would occur, and if so, if larger doses, thereafter, could bring the plant to a more passive (less corrosive) state again. Table II illustrates the results. The first seven entries show the results of Example 1, and the remaining entries show the results of two lesser daily rates followed by two larger rates. The lower rates of 0.000011 copper and 0.000132 sulfur permitted corrosion whereas the return to 0.000056 copper and 0.000674 sulfur established the non-corrosive or passive state.

TABLE II

| Time (Hrs) | Formulation Injected (mls) | Equivalent Daily Rate (mls/day) | Daily Rate (lbs/lbs/day) Cu | S | Plant Condition |
|---|---|---|---|---|---|
| 27 | 143 | 127 | 0.00007 | 0.00084 | No Corrosion |
| 24 | 88 | 88 | 0.000048 | 0.00058 | No Corrosion |
| 23 | 184 | 192 | 0.00010 | 0.00126 | No Corrosion |
| 25 | 155 | 148 | 0.00008 | 0.00098 | No Corrosion |
| 21.5 | 48 | 53 | 0.00003 | 0.00035 | No Corrosion |
| 24 | 43 | 43 | 0.000025 | 0.00030 | No Corrosion |
| 24 | 216 | 216 | 0.00012 | 0.00142 | No Corrosion |
| 6 | 34 | 136 | 0.000075 | 0.00090 | No Corrosion |
| 12 | 10 | 20 | 0.000011 | 0.000132 | Corrosion |
| 12 | 10 | 20 | 0.000011 | 0.000132 | Corrosion |
| 27 | 115 | 102 | 0.000056 | 0.000674 | No Corrosion |
| 9 | 50 | 133 | 0.000073 | 0.00088 | No Corrosion |

EXAMPLE 3

A correlation was made between the electrical resistance corrosion probes and weighed coupons to determine whether consistant and proportionate results could be obtained between the two monitoring methods. Table III lists the results. The corrosion rates in different parts of the plant differ due to their different conditions of temperature and acid-gas concentration (i.e. hot rich vs. hot lean). This is established in different circulating amine solutions listed in Table III. The hot rich solution is the solution containing the high loading of H$_2$S and CO$_2$. The hot lean is that solution in the reboiler and the stripper which contains much less H$_2$S and CO$_2$. When any one probe in any of the locations in the plant de-passivated or began to corrode, this indicated a corrosive situation existed in the plant. One probe usually de-passivated before the others; and, in fact, the hot lean probe usually de-passivated before the hot rich probe.

TABLE III

| | Corrosion Rate (MPY) | | | |
|---|---|---|---|---|
| Time Interval | Wire-Resistance Probes | | Weight Loss Coupons | |
| | Hot Rich | Hot Lean | Hot Rich | Hot Lean |
| 1 | 11.7 | 10.95 | 8.0 | 14.5 |
| 2 | 45.6 | 12.80 | 34.7 | 9.1 |
| 3 | 4.87 | 97.30 | 2.78 | 37.6 |
| 4 | 3.72 | 51.24 | 5.30 | 31.0 |
| 5 | 3.48 | 44.80 | 1.46 | 29.3 |

The wire-resistance probes show instaneous changes in corrosion rates. The weight loss coupons give only a time averaged (the intergrated) corrosion rate over a period of time. Therefore, the coupon's average periods of no corrosion and high corrosion yield only an average corrosion rate. Because of this, the wire-resistance probes are suggested to be used exclusively as an indication of corrosion or non-corrosion in the plant. The wire-resistance probe measurements indicate immediately when more inhibitor formulation should be added and show the immediate passivation effect of such an injection of inhibitor formulation. The coupons may be used and are recommended to be used as time weighted averages of corrosion which should be correlated with actual corrosion measured during a down-time or turn-around in order to insure that the electrical resistance probes continue to give the proper indication of instantaneous corrosion rate.

We claim:

1. In a method for inhibiting the corrosion of metals in contact with a circulating absorbent medium, which is used for removal of acid-gases from natural or synthetic gas streams wherein the circulating, rich absorbent is heated in order to release the acid-gases, the resulting lean absorbent is contacted with the acid-gas containing gas stream, the improvement which consists of introducing into the said medium, a product derived by reacting monoalkanolamine at from about 21° to about 100° C, with sulfur or a sulfide and an oxidizing agent, along with copper or a copper salt, sulfide or oxide, for from 0.1 to about 20 hours, until the resulting mixture is stable when diluted with water, said sulfur or sulfur compounds being present, based on sulfur, in a ratio of 3 to about 30 parts by weight per part of copper; and, in an amount of from 1 to about 40 percent by weight of the total composition, said product being added to the absorbent medium in an amount which maintains at least 0.00002 pounds each of copper and 0.0002 pounds of sulfur per pound of medium per day.

2. In a method for inhibiting the corrosion of steel which is in contact with a circulating absorbent medium of an acid-gas removal process wherein an acid-gas absorbent, rich in acid-gases, is heated to release the acid-gases and the resulting lean medium is contacted with acid-gas containing natural or synthetic gas; the improvement which consists of adding to the said medium, a copper-sulfur-monoethanolamine reaction product which is derived by heating, at from about 21° to about 100° C, copper or a copper salt, oxide or sulfide along with elemental sulfur which is dissolved in monoethanolamine, for from about 0.1 to about 20 hours, said reaction product is stable against precipitation of sulfur upon dilution with water, said sulfur being present in between about 3 to about 30 parts by weight per part of copper, said sulfur being present in an amount of from about 1 to about 40 percent by weight of the total composition, and when a sulfide is employed to supply the sulfur, then an oxidizing agent is present.

3. The corrosion inhibiting composition prepared by reacting (1) a copper yielding compound or elemental copper, (2) a sulfur yielding compound or elemental sulfur and (3) an alkanolamine, prepared at from about 21° to about 100° C for from 0.1 to 20 hours to produce a non-precipitating composition. said sulfur yielding compound being employed in the presence of an oxidizing agent.

4. The method of claim 1 wherein said product is the result of reacting sulfur, monoethanolamine and copper or copper sulfide at 90° to 100° C.

5. The method of claim 4 wherein said product is employed in an aqueous monoethanolamine absorbent acid-gas removal system in an amount to provide between about 0.000025 to 0.00012 pound of copper per pound of alkanolamine per day and 0.003 to 0.00142 pound of sulfur per pound of alkanolamine per day said ratio of copper to sulfur being about 1 to 12, respectively.

* * * * *